F. McMANUS.
Wagon Axle-Nut.
No. 87,580.                                      Patented March 9, 1869.
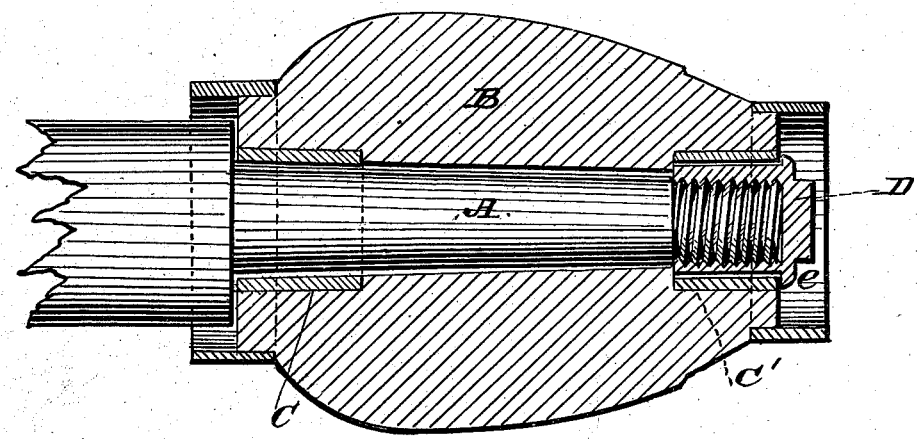
Witnesses
W. C. Ashkettle
Wm. A. Morgan
Inventor
F. McManus
per Munn & Co
Attorneys

F. McMANUS, OF ELLENBURG CENTRE, NEW YORK.

Letters Patent No. 87,580, dated March 9, 1869; antedated February 27, 1869.

IMPROVEMENT IN WAGON-AXLES.

The Schedule referred to in these Letters Patent and making part of the same

*To all whom it may concern:*

Be it known that I, F. McMANUS, of Ellenburg Centre, in the county of Clinton, and State of New York, have invented a new and useful Improvement in Fastening Nuts on Wooden Wagon-Axles; and I do hereby declare that the following is a full, clear, and exact description thereof, which will enable those skilled in the art to make and use the same, reference being had to the accompanying drawings, forming part of this specification.

My invention relates to an improvement in the method of constructing and applying the nuts of wooden wagon-axles, that are used for holding the wheels on the same; and It consists in extending the nut into the hub as deep as the outer box of the hub, and screwing it on to the axle, with a thread cut in the direction that will not be unscrewed by the action of the hub, and turning it down on the outside, to fit into the said box, and form the outer bearings of the axle within the hub, as will be more fully described on reference to the accompanying drawings, wherein a sectional view of a hub and nut are shown.

A represents the axle.
B, the hub.

C and C', the metal boxes, fitted into the hub in the usual manner.

D, the nut, turned to fit the box C', so as to constitute a bearing, upon which the said box turns, the thread being so formed on the axle and the nut, that any tendency of the same to turn, by reason of the friction of the box on the nut, will be in the direction to tighten it on the axle. The said nut has a flange, bearing against the end of the box, which keeps the hub on the axle.

The nuts may be cast upon a sand core, having a screw-thread formed on it, or the thread may be tapped in them, as may be desired.

Having thus fully described my invention,

What I claim, and desire to secure by Letters Patent, is—

The nut D, as formed, threaded, and flanged, and screwed upon the axle A within the metal box C', in the manner and for the purposes herein set forth and described.

F. McMANUS.

Witnesses:
    HIRAM VANARANAM,
    MARTIN BOURNS.